(12) United States Patent
Brooks et al.

(10) Patent No.: US 7,009,521 B2
(45) Date of Patent: Mar. 7, 2006

(54) POWER SUPPLY AND INTERCONNECT DETECTOR SYSTEM

(75) Inventors: Floyd E. Brooks, Montgomery, IL (US); Romualdo S. Siazon, Carpentersville, IL (US); Kenneth L. Venzant, Bolingbrook, IL (US); Derek S. Johnston, Aurora, IL (US)

(73) Assignee: BRK Brands, Inc., Aurora, IL (US)

( * ) Notice: Subject to any disclaimer, the term of this patent is extended or adjusted under 35 U.S.C. 154(b) by 783 days.

(21) Appl. No.: 09/969,023

(22) Filed: Oct. 2, 2001

(65) Prior Publication Data

US 2002/0070857 A1 Jun. 13, 2002

Related U.S. Application Data

(60) Provisional application No. 60/238,183, filed on Oct. 5, 2000.

(51) Int. Cl.
*G08B 17/12* (2006.01)

(52) U.S. Cl. ............... 340/577; 340/578; 340/628; 340/630; 340/632; 340/539.1; 340/539.19

(58) Field of Classification Search ............... 340/521, 340/531, 693.6, 628, 630, 577, 584, 632, 340/578, 588, 539.1, 539.19; 379/97, 107
See application file for complete search history.

(56) References Cited

U.S. PATENT DOCUMENTS

| 4,148,019 | A |   | 4/1979  | Durkee |
|-----------|---|---|---------|--------|
| 4,893,332 | A |   | 1/1990  | Brown |
| 5,019,805 | A | * | 5/1991  | Curl et al. ............... 340/628 |
| 6,323,780 | B1 | * | 11/2001 | Morris .................. 340/692 |

FOREIGN PATENT DOCUMENTS

| EP | 0 451 445 A3 | 10/1991 |
| GB | 1 514 909 | 6/1975 |
| GB | 2 016 150 A | 9/1979 |
| GB | 2 129 138 A | 5/1984 |
| WO | WO 87/07105 | 11/1987 |

\* cited by examiner

*Primary Examiner*—Hung Nguyen
(74) *Attorney, Agent, or Firm*—Lawrence J. Shurupoff

(57) ABSTRACT

A contactless ambient condition detection system includes at least one base connectable to a power and signal transmitting cable and a compatible detector. The detector removably engages the base. Electrical energy, from the cable is wirelessly coupled to the detector via the base. The detector is in wireless bidirectional communication with the base. Alarm indicating signals, generated remotely, can be wirelessly coupled, from the cable via the base, to the detector. Locally generated alarms can be wirelessly coupled to the cable. Detectors can be replaced without exposing the installer to AC contacts.

16 Claims, 7 Drawing Sheets

NORMAL POWER LINE CONDITION (1 MHZ SIGNAL):

SMOKE ALARM CONDITION (1MHZ SIGNAL) - MODULATED 1 MHZ SIGNAL

MODULATED 1 MHZ GAS ALARM SIGNAL

… (continued)

POWER SUPPLY AND INTERCONNECT DETECTOR SYSTEM

This Utility Application claims the benefit of Provisional Application Ser. No. 60/238,183, filed Oct. 5, 2000.

FIELD OF THE INVENTION

The invention pertains to systems of wired, interconnected detectors. More particularly, the invention pertains to such systems wherein detectors can be safely and conveniently removed from or coupled to the respective system.

BACKGROUND OF THE INVENTION

Known systems of interconnected detectors usually incorporate three wire cables which provide AC energy to each of the detectors via two of the wires. The third wire is used for signaling. When one detector goes into alarm, it can signal via the third wire, its alarm state to all other detectors in the system. The remaining detectors then go into alarm.

When detector systems are installed, during construction, after testing the detectors are usually removed for safekeeping. They must then be reinstalled subsequently for occupancy. Known detectors for such systems incorporate a base and a separable head which carries a sensor and control electronics.

Each base is permanently mounted on a surface, such as a ceiling. In one known system, a three wire cable is connected to three contacts on each base. Each base exhibits three electrical contacts, two for AC and one for signaling.

Each of the heads can slidably engage a base. Three electrical contacts on a respective head, two for AC and one for signaling, slidably engage corresponding contacts on the base as the head is being installed.

The presence of contacts on the base and head tends to create installation and maintenance issues. The contacts must be kept clean, not always easy to do during construction, and installation personnel must be able to clean particulate matter from the base as needed prior installing the heads.

There continues to be a need for electrical signal transfer systems usable with interconnected detectors. Preferably such transfer systems would alleviate at least some of the cleanliness problems of known detector systems. It would also be preferable if such transfer systems did not substantially increase unit costs or create manufacturing complexity.

SUMMARY OF THE INVENTION

Interconnectable detectors each have a base and a sensor carrying head. The bases are each mechanically connected to a common multi-wire cable. The cable carries electrical energy for the detectors.

Each head releasibly engages a respective base. Electrical energy from the cable is wirelessly transferred between the base and the head.

No exposed contacts are present on either the base or the head. Problems associated with greasy or dirty contacts are eliminated. Non-contact dirt is also reduced due to smoother and uninterrupted exterior plastic surfaces.

Removable of a head from a base is carried out without exposing maintenance personnel to voltage carrying contacts. In addition, when a replacement head is coupled to a base, there will be no exposure to such contacts.

In one embodiment, a base and installed head form a transformer for wireless transfer of power from the base to the head. To improve coupling, one of the base and the head can carry an core. Alternately, capacitive or optical coupling could be used.

In another embodiment, a signal carrying conductor can be incorporated into the cable. Information carrying signals can be wirelessly and bidirectionally coupled between a base and a head. For example, an alarm indicating signal can be wirelessly coupled from a head that has gone into alarm to the signal carrying conductor and then wirelessly coupled to the rest of the heads in the system. Hence, alarm conditions can be audibly and/or visibly indicated not only at the detector which has gone into alarm but at all of the remaining detectors in the system.

Detectors in accordance with the present invention should be effective in deterring theft. Once the head has been removed from a base, it becomes inoperative for its intended purpose. As such, theft of detector heads may diminish.

Numerous other advantages and features of the present invention will become readily apparent from the following detailed description of the invention and the embodiments thereof, from the claims and from the accompanying drawings.

DETAILED DESCRIPTION OF THE PREFERRED EMBODIMENTS

Figure 1:
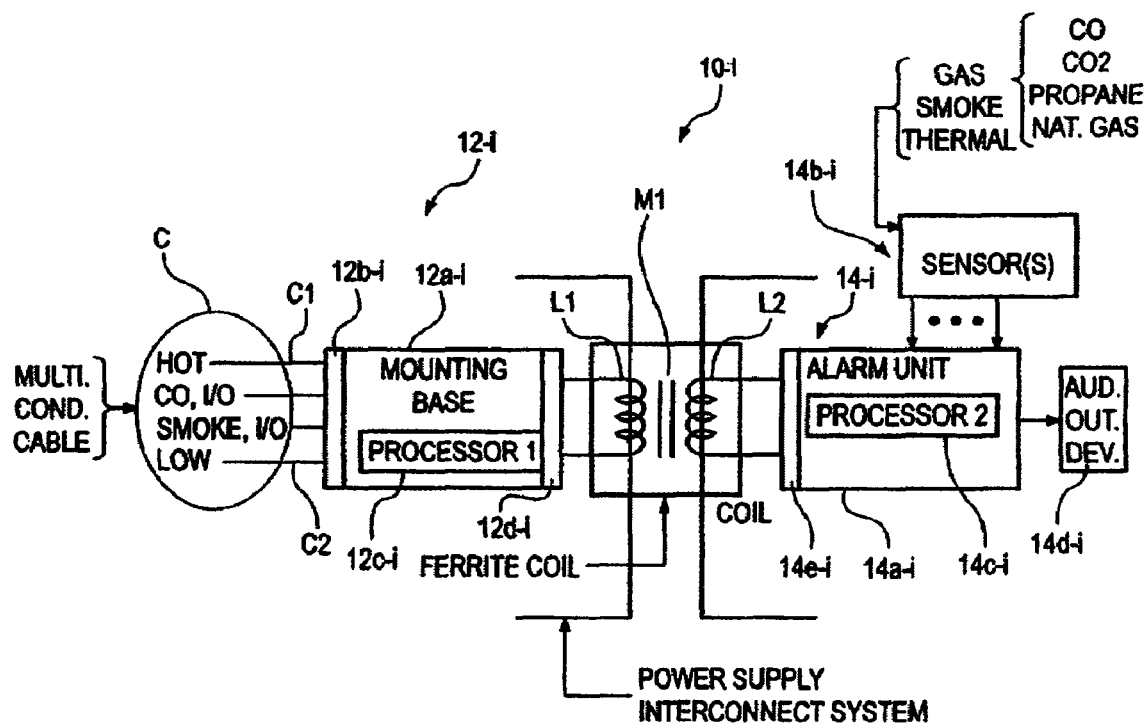
FIG. 1 is a block diagram schematic of a detector in accordance with the present invention.

While this invention is susceptible of embodiment in many different forms, there are shown in the drawing and will be described herein in detail specific embodiments thereof with the understanding that the present disclosure is to be considered as an exemplification of the principles of the invention and is not intended to limit the invention to the specific embodiments illustrated.

FIG. 1 illustrates a condition detector 10-i in accordance with the present invention. Detector 10-i includes a base 12-i and an alarm unit, or head 14-i. The head is removably couplable to the base. Detector 10-i can be incorporated into a system of the same or similar detectors via a multiple conductor cable C having three or four conductors for example.

The base 12-i has a housing 12a-i which carries an electrical connector for coupling to the cable C. The housing 12a-i also carries electronic circuitry including a cable interface 12b-i, control circuitry 12c-i which could be implemented using a programmed processor, for example a microprocessor. The processor 12c-i is also coupled to base coupling circuits 12d-i. The base coupling circuits 12d-i are in turn coupled to an inductor L1.

The alarm unit 14-i has a housing 14a-i which carries one or more condition sensors 14b-i, such as smoke, gas—for example CO, thermal or any other condition sensor of interest. Outputs from the sensor, or sensors 14b-i are coupled to control circuits, which could include a processor 14c-i such as a microprocessor. Processor 14c-i is in turn coupled to interface circuits 14c-i. One or more alarm indicating output devices, such as audible or visible alarms 14d-i are also coupled to processor 14c-i.

The interface circuits 14c-i are in turn coupled to inductor L2. Inductors L1, L2 are coupled together to facilitate the transfer of electrical signals therebetween. Coupling can be enhanced by using an iron, ferrite, core M1.

Energy and electrical signals can be transferred between the base 12-i and head 14-i without any need for mechanical/electrical connections therebetween. Instead, the coupled inductors L1, L2 implement a wireless energy/signal transfer system. In a preferred mode of operation, discussed in more detail subsequently, base 12a-i can transfer electrical energy, received from cable C, to alarm unit 14-i. Modulated information carrying signals can also be transferred between the units.

Figure 2:
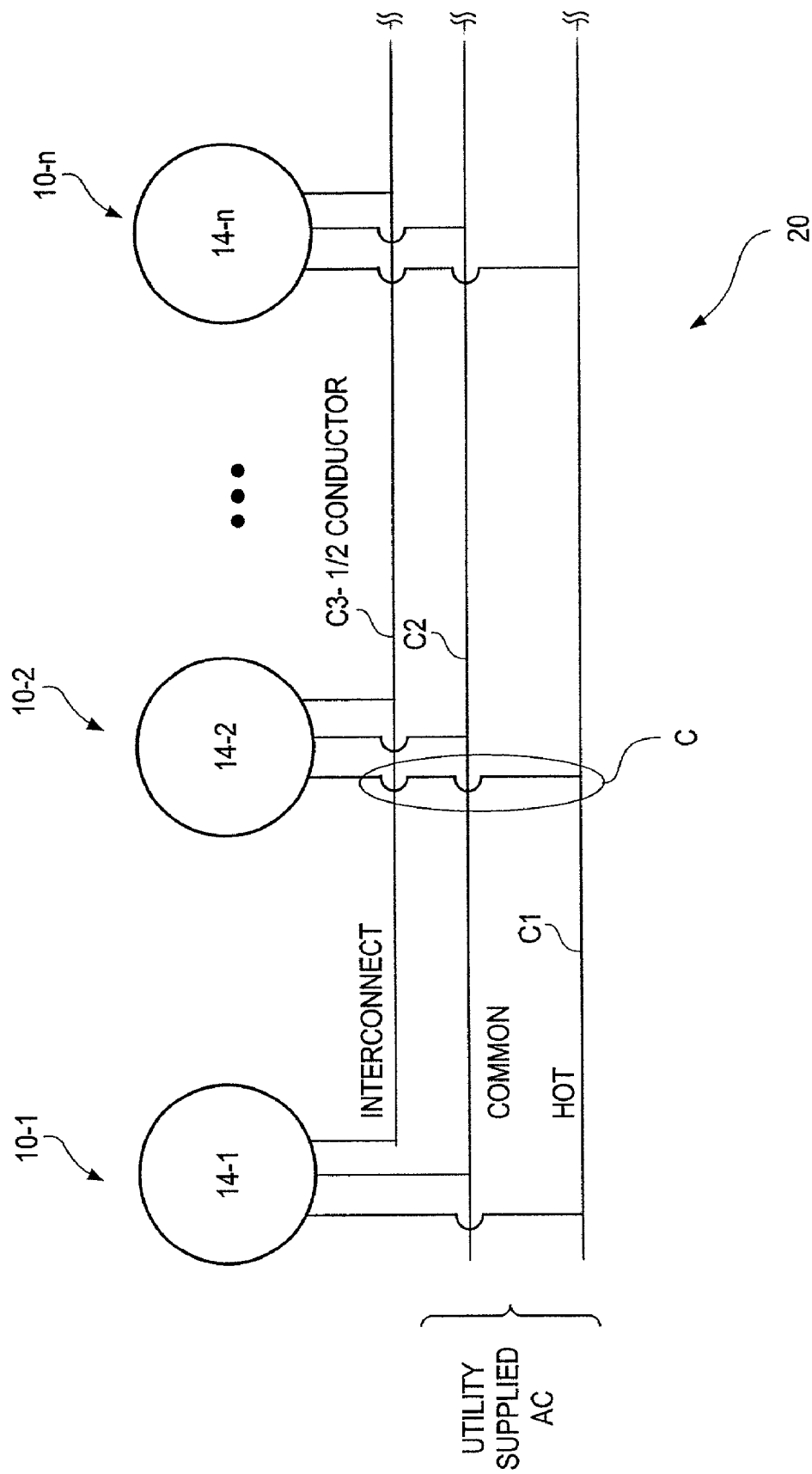
FIG. 2 is a diagram of a system of detectors as in FIG. 1.

FIG. 2 illustrates a system 20 which includes a plurality of detectors, such as the detector 10-i. The detectors are interconnected by the cable C, illustrated as a three conductor cable C1, C2, C3. Where one of the detectors, such as 10-1 goes into alarm, it generates a local audible, or visible alarm indication. Additionally, via the interconnect conductor C3, detector 10-1 signals remaining detectors in the system. These in turn go into alarm. These detectors can also indicate that the alarm has been initiated by a remote detector.

Conductors C1, C2 can be used to provide utility originated AC-type electrical energy to the detectors 10-1, -2, . . . -n. One of the advantages of the system 20 is that it can support a wide range of applied AC, for example 120–250 volts AC without any need for circuit changes, jumpers or switches. Hence, installation is easy and convenient. It is also safe to install since there are no exposed contacts between the heads 14-i and respective bases 12-i.

Figure 3:
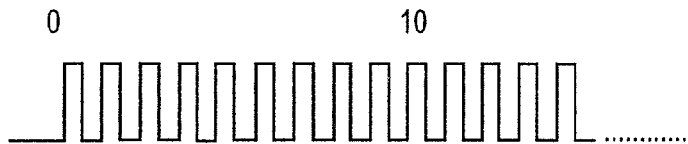
FIG. 3 is a graph of an exemplary power modulation signal usable with the detector of FIG. 1.
Figure 4:
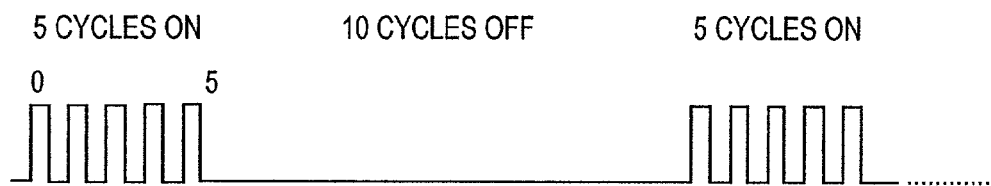
FIG. 4 is a graph illustrating an exemplary modulation scheme usable with the detector of FIG. 1.
Figure 5:
FIG. 5 is a graph illustrating a second exemplary modulation scheme usable with the detector of FIG. 1.

FIGS. 3, 4 and 5 illustrate a communications protocol usable with the detectors such as the detector 10-i. As illustrated in FIG. 3 base 12a-i can convert electrical energy such as AC or DC-type energy, received from cable C to higher frequency, for example 1 MHz signals. These signals in turn can be coupled via inductors L1, L2 to alarm unit 14-i to supply operating energy. This transfer of operating energy, except as discussed below, can be continuous or intermittent as desired. The unit 14-i can receive energy whenever it engages the base 12-i. Hence, energy can be wirelessly coupled between the units.

FIG. 4 illustrates one type of modulation usable with detectors such as 10-i. It will be understood that other types of modulation could be used without departing from the spirit and scope of the present invention. In FIG. 4 the power transferring pulses are interrupted for a number of cycles to indicate a smoke alarm-type condition. Similarly, FIG. 5 illustrates a variation of the process of FIG. 4 to indicate the presence of a gas alarm.

For example, where a base, such as base 12-i receives a signal via cable C, that another detector in the system 20 has detected sufficient smoke to go into alarm, the base 12a-i will modulate the energy transfer signal as illustrated in FIG. 4. This modulation will be detected by processor 14c-i causing that alarm unit to go into a remotely generated smoke alarm. Similarly, where the base 12a-i receives a signal, via cable C, of a gas alarm elsewhere in the system, it can modulate the energy transfer signal, as in FIG. 5 to communicate the presence of a gas condition to the alarm unit 14-i. Unit 14-i will in turn energize output device 14d-i so as to indicate the existence of a remotely detected gas condition.

Where unit 14-i goes into a local alarm, it can intermittently shunt coil L2 to indicate the existence of and type of alarm. This will in turn induce a modulated current signal in coil L1. Process 12c-i can detect the type of modulation. The base 12-i can then alert the remaining detectors in the system to the alarm condition. It will be understood that the exact type of modulation is not a limitation of the invention.

Figure 6:
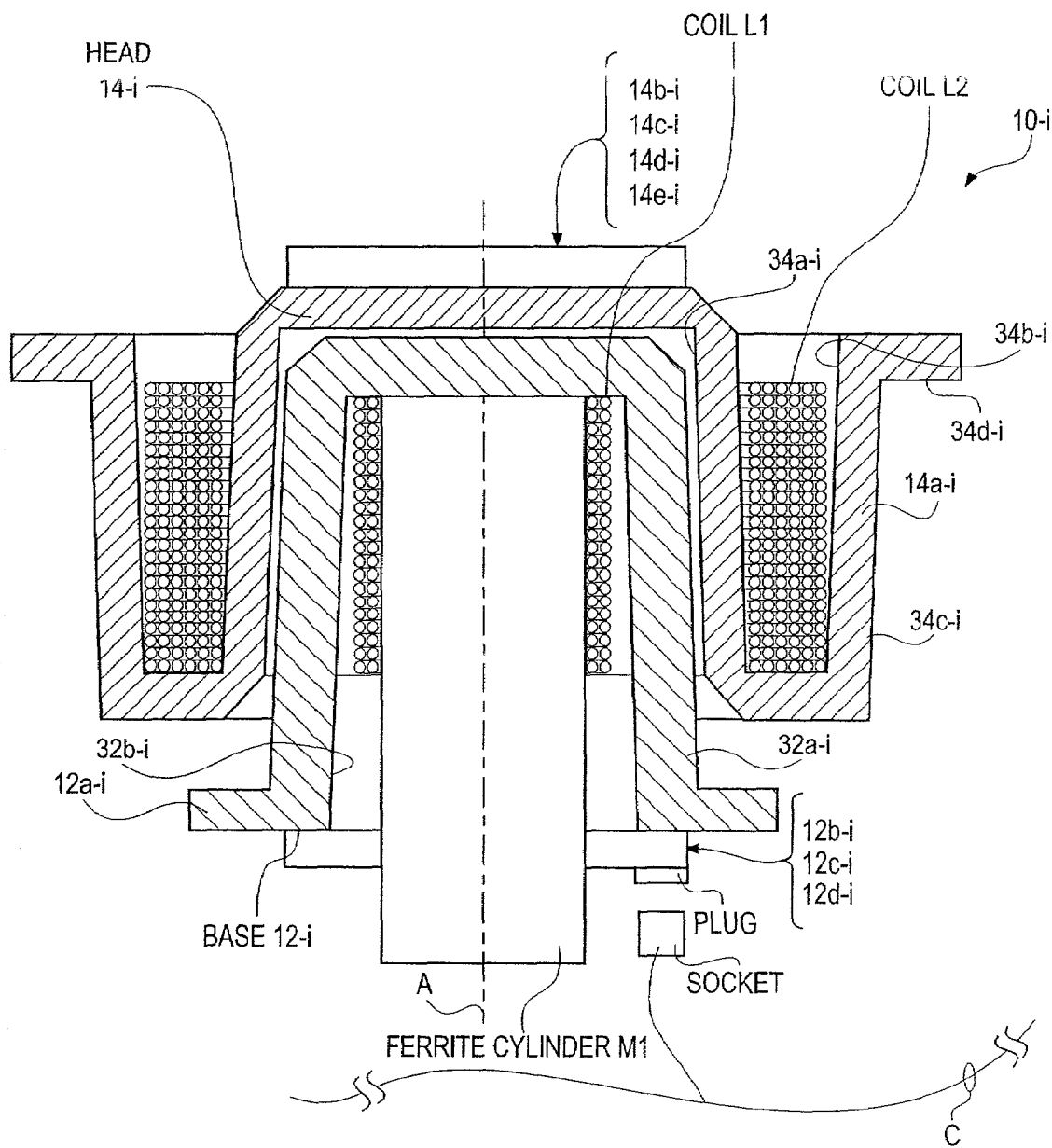
FIG. 6 is an enlarged, side sectional view illustrating details of the detector of FIG. 1.

FIG. 6, an enlarged, side sectional view of detector 10-i illustrates base 12a-i with a head 14-i coupled thereto. The base 12-i carries, in housing 12a-i, a cylindrical protrusion 32a-i preferably centrally located thereon. The protrusion carries primary coil L1 which is wound around a ferrite cylinder or core M1.

The head 14-i exhibits a centrally located cylindrical depression 34a-i which receives the protrusion 32a-i when coupled to the base 12-i. Secondary coil L2 is carried in an annular region 34b-i between cylindrical depression 34a-i and surface 34c-i. Since the head 14-i is symmetrical relative to a center line A of base 12-i, it may be installed on the base 12-i with any orientation and the coupling between coils L1 and L2 will be substantially identical.

Figure 7:
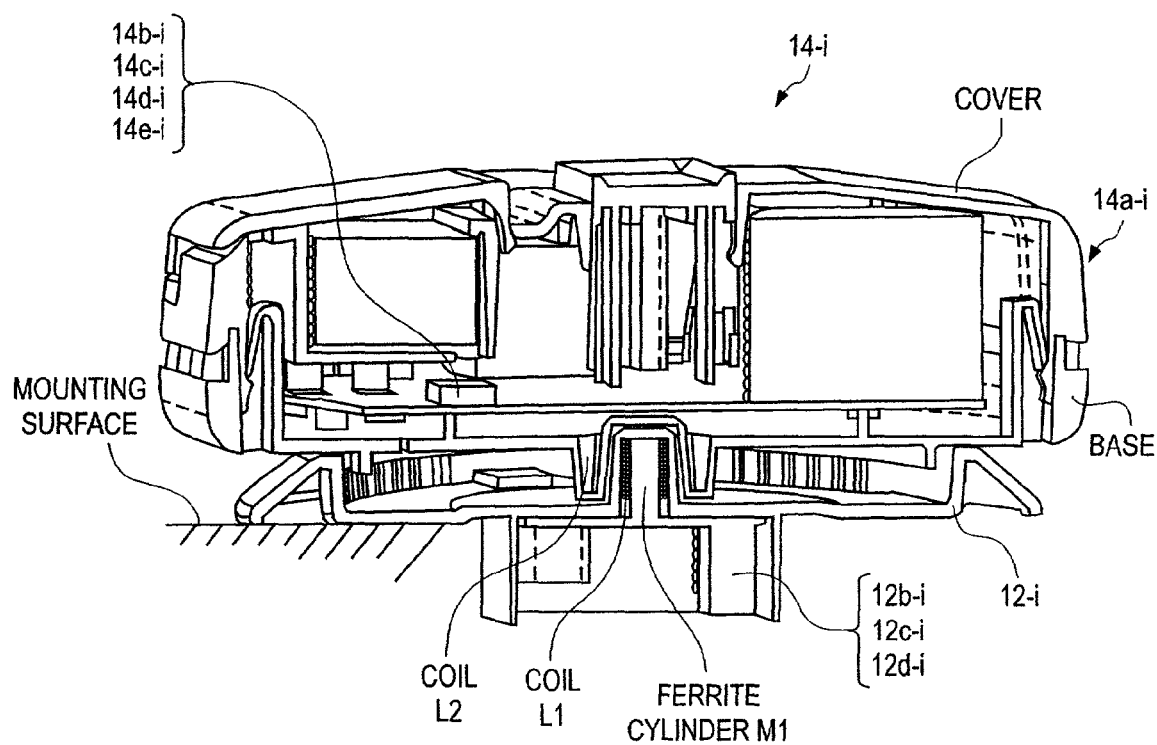
FIG. 7 is an enlarged, side sectional view of a solid rendering of the detector of FIG. 1.
Figure 8:
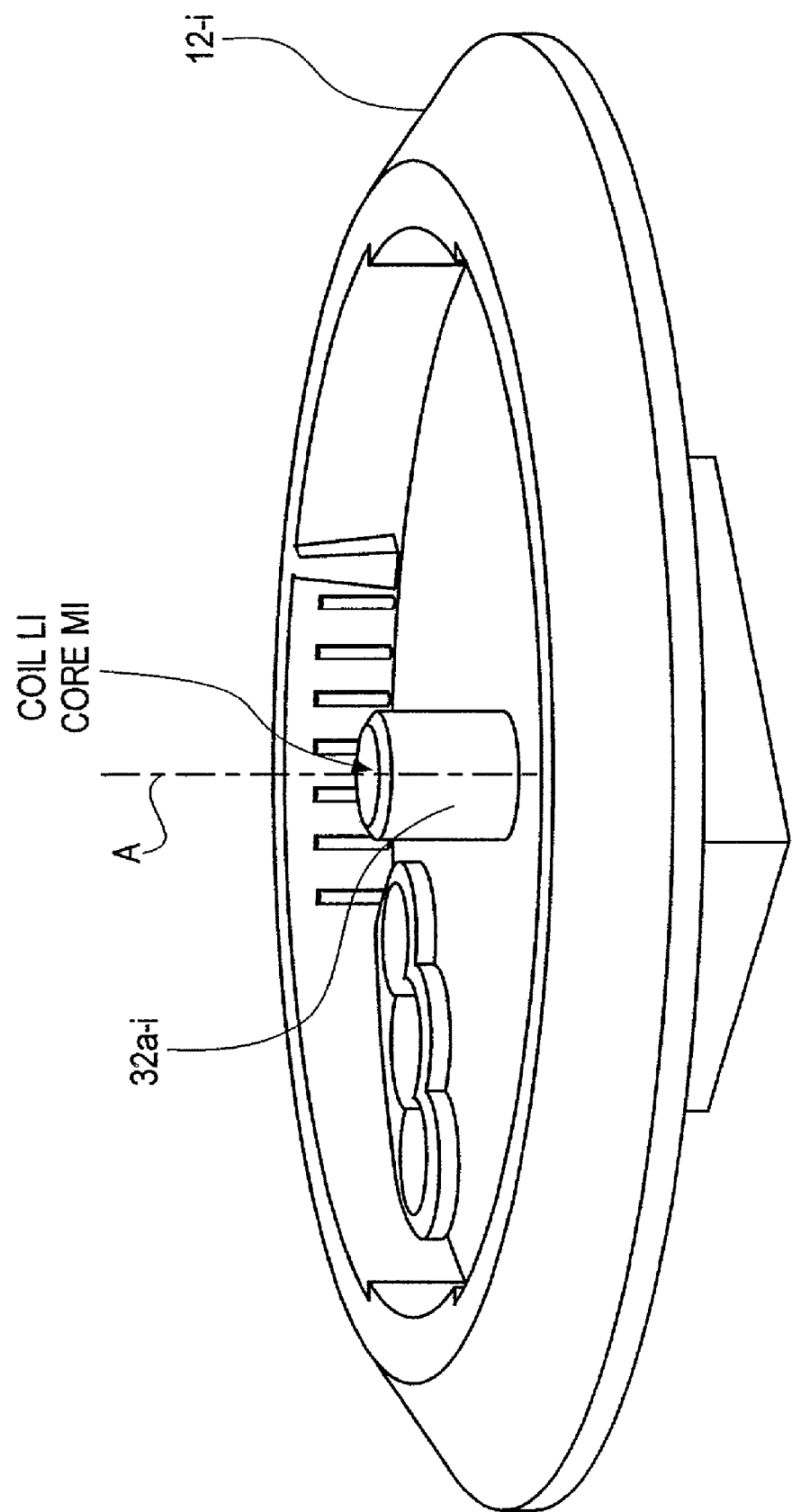
FIG. 8 is a perspective view of a base of a type usable in combination with the detector of FIG. 1.

FIG. 7 a sectional view in perspective illustrates further details of the head 14-i as coupled to base 12-i. FIG. 8 is a perspective view of base 12-i without the head 14-i coupled thereto. As illustrated in FIG. 8, the housing 32a-i for the coil L1 and core M1 is centrally located relative to the axis A. It will be understood that the base 12-i while preferably cylindrical, is not limited to such shapes. Other shapes can be used without departing from the spirit and scope of the present invention.

Figure 9:
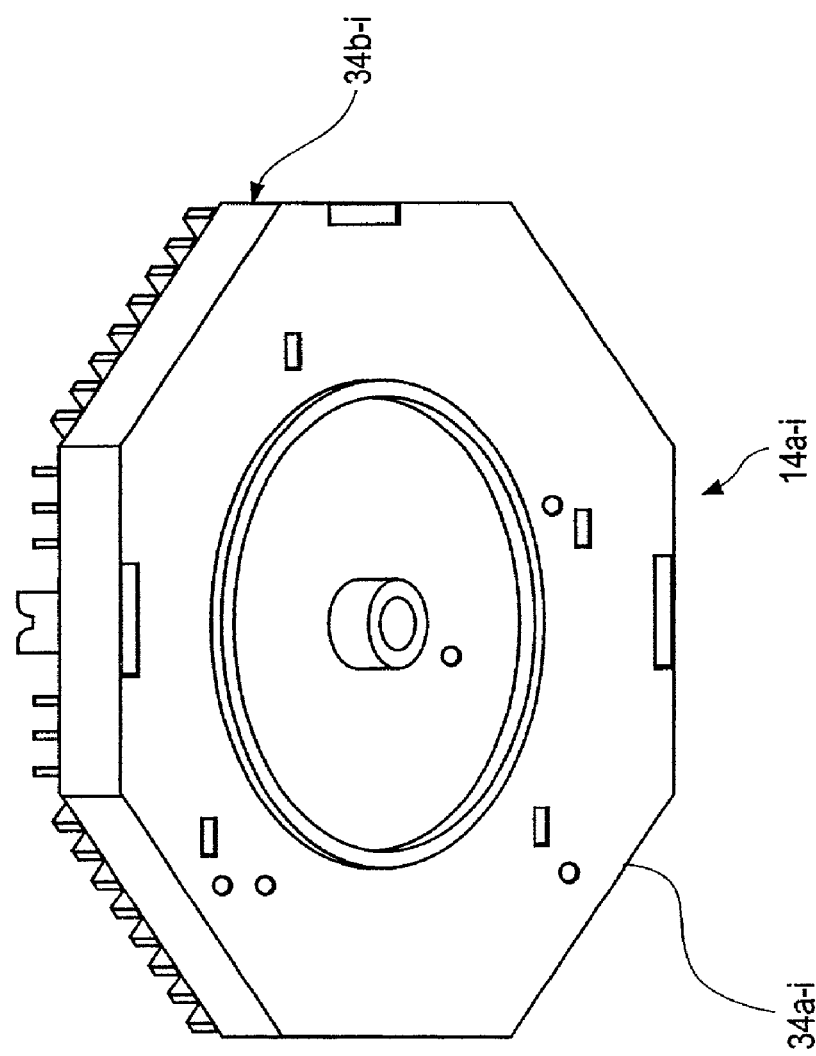
FIG. 9 is a perspective view of a portion of the detector of FIG. 1.

FIG. 9 illustrates in perspective an exemplary lower portion 34b-i of the of the housing 14a-i. As illustrated the housing 14a-i carries the centrally located protrusion 34a-i. It will be understood that while an exemplary octagon-shaped head 14-i has been illustrated, other shapes come within the spirit and shape of the present invention.

From the foregoing, it will be observed that numerous variations and modifications may be effected without departing from the spirit and scope of the invention. It is to be understood that no limitation with respect to the specific apparatus illustrated herein is intended or should be inferred. It is, of course, intended to cover by the appended claims all such modifications as fall within the scope of the claims.

What is claimed:

1. An assemblage comprising:
   at least one ambient condition detector with wireless power receipt circuitry for receipt of electrical energy;
   at least one base with wireless power transfer circuitry for transfer of electrical energy wherein a base and a respective detector are releasably engageable, and when so engaged, the base can wirelessly transfer electrical energy to the detector.

2. An assemblage as in claim 1 wherein the releasibly engageable base and detector each include circuitry for the wireless transfer of status indicating signals.

3. An assemblage as in claim 1 wherein at least the detector includes a centrally located, symmetrical, coupling feature, wherein the feature is nestable with a corresponding feature of the base.

4. An assemblage as in claim 1 wherein the detector includes at least one of a smoke sensor, a heat sensor and a gas sensor.

5. An assemblage as in claim 4 wherein at least the detector includes circuitry for coupling a modulated status indicating signal wirelessly to the base.

6. An assemblage as in clam 5 wherein the detector includes circuitry for wirelessly receiving alarm indicating signals, generated by a remote detector.

7. An assemblage as in claim 6 wherein the detector includes at least one of audible alarm indicating output device and a visible alarm indicating output device and circuitry responsive to a received alarm indicating signal for activating a respective alarm indicating device.

8. An assemblage as in clam 4 wherein the power transfer circuitry of the base includes conversion circuitry which receives electrical energy in a first form and converts same to a second form for wireless transfer to a respective detector.

9. An assemblage as in claim 8 wherein the conversion circuitry includes a modulator of received electrical energy.

10. An assemblage as in claim 8 wherein the conversion circuitry includes circuit elements configured to receive AC-type electrical energy in a range of 110–260 volts AC.

11. A detector assembly comprising:
   a sensing head for sensing at least one ambient condition, and a base wherein the head is removably couplable to the base;
   the head having a first portion of a wireless, electrical energy transfer device, the base having a second portion wherein when coupled together, electrical energy can be wirelessly transferred from the base to the head by one of inductive coupling, capacitive coupling and optical coupling.

12. An assembly as in claim 11 wherein the head includes a housing symmetrically located relative to the first portion of the transfer device, and carrying a second, different ambient condition sensor.

13. An assembly as in claim 12 wherein the head includes control circuits coupled to the sensors and to a first portion of the transfer device and wherein the control circuits, in response to a predetermined alarm condition associated with one of the sensors, couple a modulated alarm indicating signal, wirelessly, to the second portion.

14. An assembly as in claim 11 wherein the head includes circuitry for wirelessly transmitting sensed ambient condition related information to the base.

15. An assembly as in claim 11 wherein the base includes circuitry for wirelessly transmitting ambient condition related information received from a different detector assembly, to the sensing head.

16. An assembly as in claim 15 wherein the head includes an audible output device and circuitry for driving same to produce a first audible output indicative of a predetermined ambient condition sensed at the head and a second audible output indicative of a predetermined ambient condition sensed at a displaced head.

\* \* \* \* \*